(12) United States Patent  
Seo

(10) Patent No.: US 10,939,003 B2  
(45) Date of Patent: Mar. 2, 2021

(54) INFORMATION PROCESSING DEVICE AND IMAGE FORMING APPARATUS

(71) Applicant: Sharp Kabushiki Kaisha, Sakai (JP)

(72) Inventor: Kayoko Seo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 628 days.

(21) Appl. No.: 15/298,363

(22) Filed: Oct. 20, 2016

(65) Prior Publication Data

US 2017/0118361 A1    Apr. 27, 2017

(30) Foreign Application Priority Data

Oct. 27, 2015 (JP) .............................. JP2015-210368

(51) Int. Cl.
*H04N 1/00* (2006.01)
*H04N 1/44* (2006.01)

(52) U.S. Cl.
CPC ..... *H04N 1/00514* (2013.01); *H04N 1/00411* (2013.01); *H04N 1/00427* (2013.01); *H04N 1/00432* (2013.01); *H04N 1/00474* (2013.01); *H04N 1/00501* (2013.01); *H04N 1/4406* (2013.01); *H04N 2201/0089* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2010/0157359 A1* | 6/2010 | Steiner | G06F 3/1204 358/1.15 |
| 2011/0252346 A1* | 10/2011 | Chaudhri | G06F 3/04817 715/765 |
| 2013/0246509 A1 | 9/2013 | Sakiyama et al. | |
| 2015/0121194 A1* | 4/2015 | Patten | G06F 3/0483 715/234 |
| 2016/0077687 A1* | 3/2016 | Watanabe | H04N 1/0035 715/763 |
| 2016/0094738 A1* | 3/2016 | Ono | H04N 1/00501 358/1.15 |

FOREIGN PATENT DOCUMENTS

| | | |
|---|---|---|
| CN | 1991746 A | 7/2007 |
| CN | 103312928 A | 9/2013 |
| JP | 2006-285968 A | 10/2006 |

* cited by examiner

*Primary Examiner* — Fan Zhang
(74) *Attorney, Agent, or Firm* — Keating & Bennett, LLP

(57) ABSTRACT

An information processing device is provided with a terminal screen processing portion. When the terminal screen processing portion receives from a terminal a command to register and delete a functional item of each function that the information processing device executes, the terminal screen processing portion registers and deletes a selected functional item with respect to a shortcut tab of a list page and also guides a screen of the list page of a result of registration and deletion to a display portion of the terminal. Furthermore, the terminal screen processing portion, when receiving from a terminal a command to delete a functional item to be the last with respect to the list page, creates a screen in which the list page is not displayed, and guides the screen to the display portion of the terminal.

9 Claims, 15 Drawing Sheets

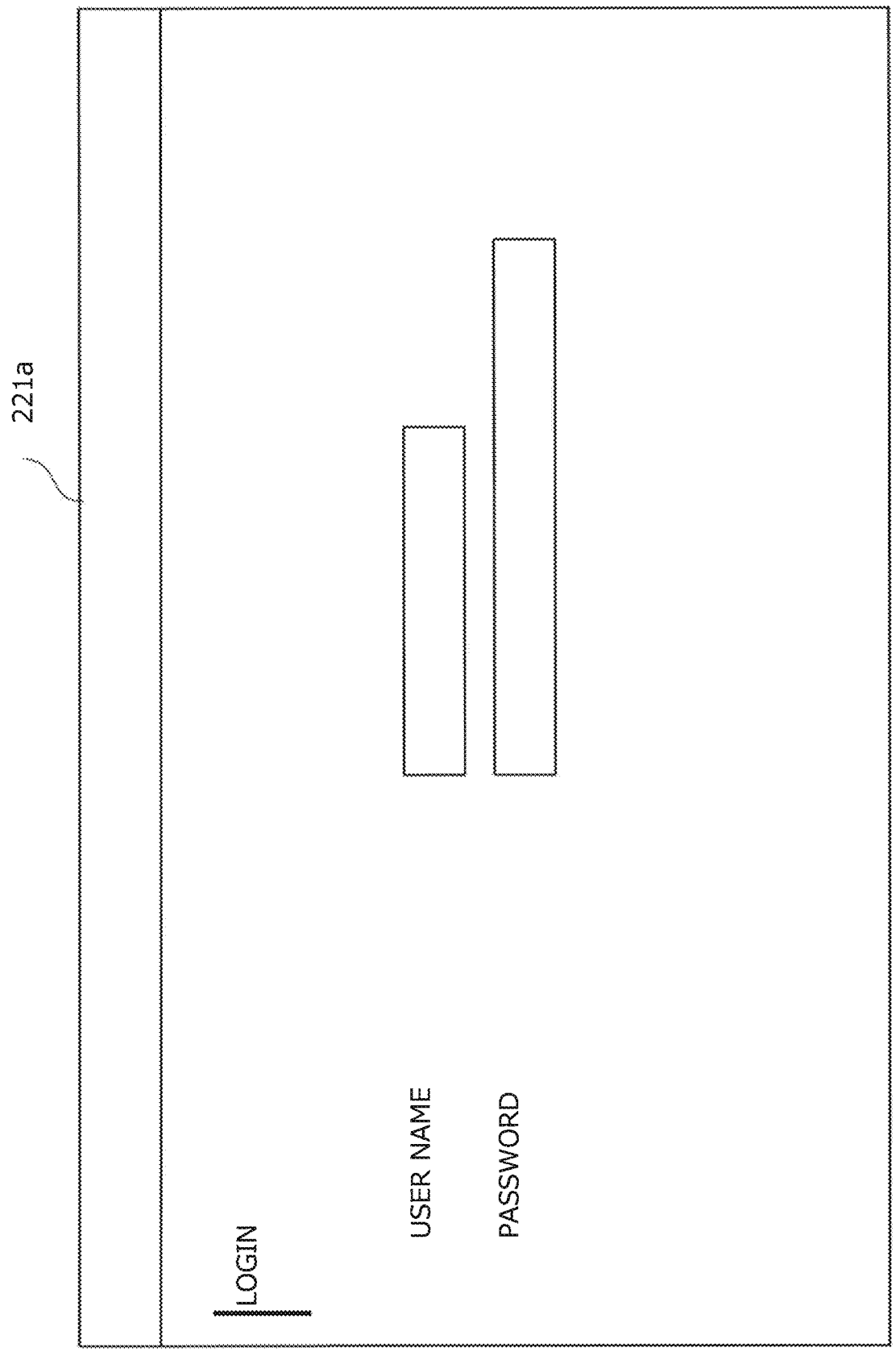

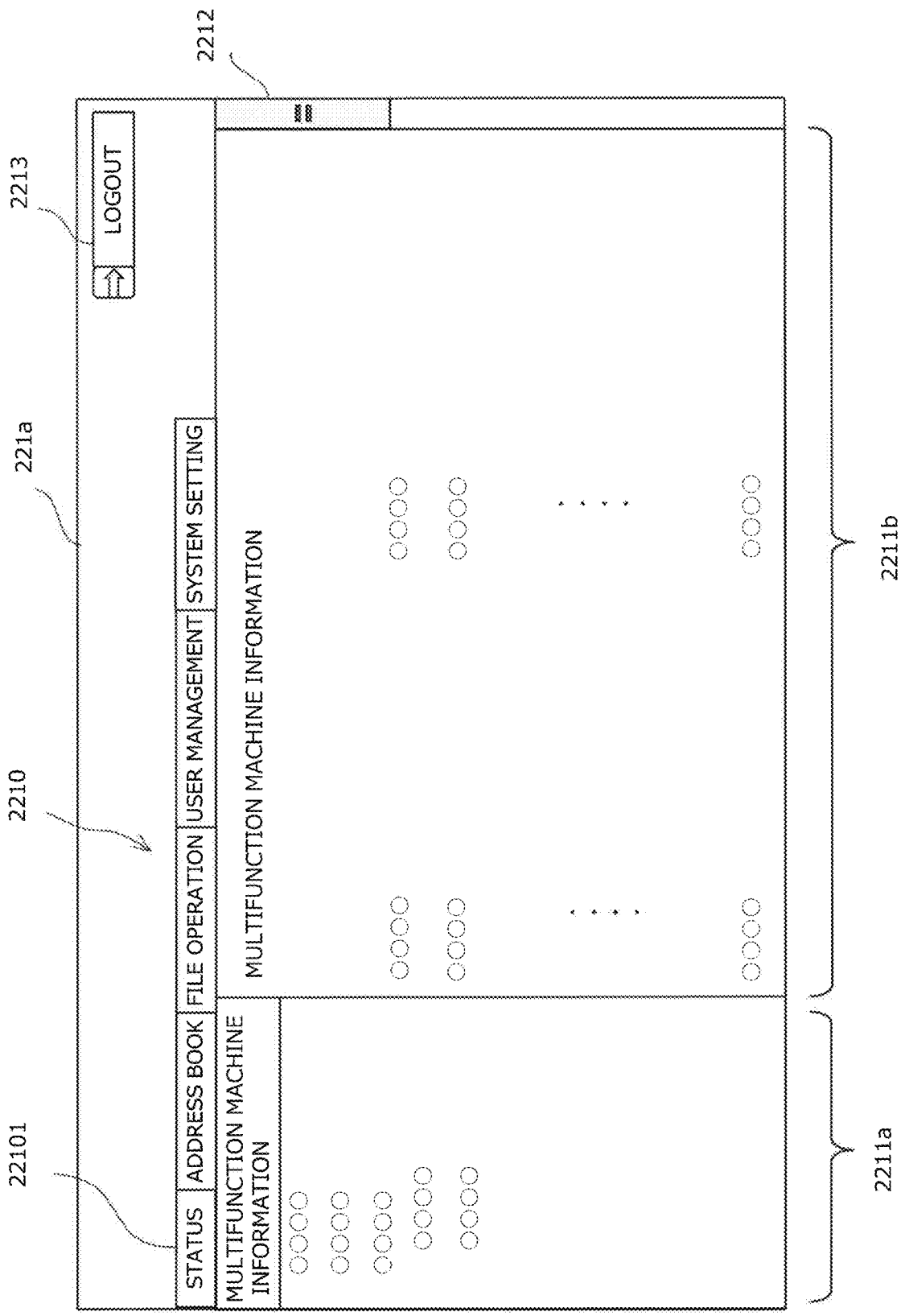

INFORMATION PROCESSING DEVICE AND IMAGE FORMING APPARATUS

CROSS REFERENCE

This Nonprovisional application claims priority under 35 U.S.C. § 119(a) on Patent Application No. 2015-210368 filed in Japan on Oct. 27, 2015, the entire contents of which are hereby incorporated by reference.

BACKGROUND OF THE INVENTION

The present invention relates to an information processing device capable of setting a plurality of functional items relating to information processing including image information processing and an image forming apparatus provided with such an information processing device.

Conventionally, a technique in which various print settings with respect to an image forming apparatus are performed by a computer device has been proposed. In such print settings, by utilizing a tab in which print items are uniformly divided into functions, for example, the display density of the print setting items is reduced and the operability at the time of setting is ensured. Additionally, in recent years, the number of tabs also increases with the increase of the number of print setting items, and, since high frequently used print items and low frequently used print items are mixed and displayed, efficient use is prevented from the standpoint of a user. In view of the foregoing, a technique such as use of a shortcut key and an efficient arrangement of a print setting item or a tab in order to ensure the use efficiency has been known.

Japanese Patent Laid-Open Publication No. 2006-285968 discloses a print setting processing device that achieves an efficient use by changing and displaying the display mode of a function setting item. In other words, the print setting processing device disclosed in Japanese Patent Laid-Open Publication No. 2006-285968 measures the frequency of use of a function setting item, makes a low frequently used function setting item not-displayed, sequentially lowers the display ranking of the tab including the low frequently used function setting item and finally makes the tab not-displayed, and enables a user to easily select and use a plurality of function setting items. On the one hand, the procedure of changing a non-display state back to a redisplay state through a button operation from a management screen is also employed.

According to the print setting processing device disclosed in Japanese Patent Laid-Open Publication No. 2006-285968, since each tab includes the function setting items previously divided by function, it is not desirable that a low frequently used tab is not displayed because some of the plurality of function setting items are eliminated from a use area, which, on the contrary, causes a problem in convenience, such that a user may be forced to perform an operation to return the non-display state to the redisplay state. On the other hand, in a case in which a certain function setting item is set, since the list of all the function setting items divided into the tab including this function setting item is always displayed, efficient display and use is limited to some degree.

In view of the foregoing, preferred embodiments of the present invention are directed to provide an information processing device that enables creation of an individual tab peculiar to a user and ensures efficient display and use by making a list page not-displayed when all the functional items in the list page of the individual tab are deleted, and an image forming apparatus including such an information processing device.

SUMMARY OF THE INVENTION

An information processing device according to a preferred embodiment of the present invention is capable of executing a plurality of functions relating to information processing and includes: a screen creation portion that is connected to a terminal including a display portion and an operating portion through a network and displays an individual tab on the terminal, the individual tab including a plurality of functional items previously arranged for each screen and having a list page in which a functional item among the plurality of functional items for each screen is able to be arbitrarily registered and deleted; and a setting processing portion that receives a command to register and delete the functional item from the terminal and then performs the registration and deletion of a selected functional item with respect to the list page, and also guides a screen of the list page of a result of the registration and deletion to the display portion of the terminal. The screen creation portion, when receiving from the terminal a command to delete a functional item to be last with respect to the list page, creates a screen in which the list page is not displayed and guides the screen to the display portion of the terminal.

The foregoing and other features and attendant advantages of the present invention will become more apparent from the reading of the following detailed description of the preferred embodiments with reference to the attached drawings.

BRIEF DESCRIPTION OF THE DRAWINGS

FIG. 3 is a view of a login screen displayed on the terminal.

FIG. 4 is a view of a home screen displayed on the terminal.

DETAILED DESCRIPTION OF THE EMBODIMENTS

Figure 1:
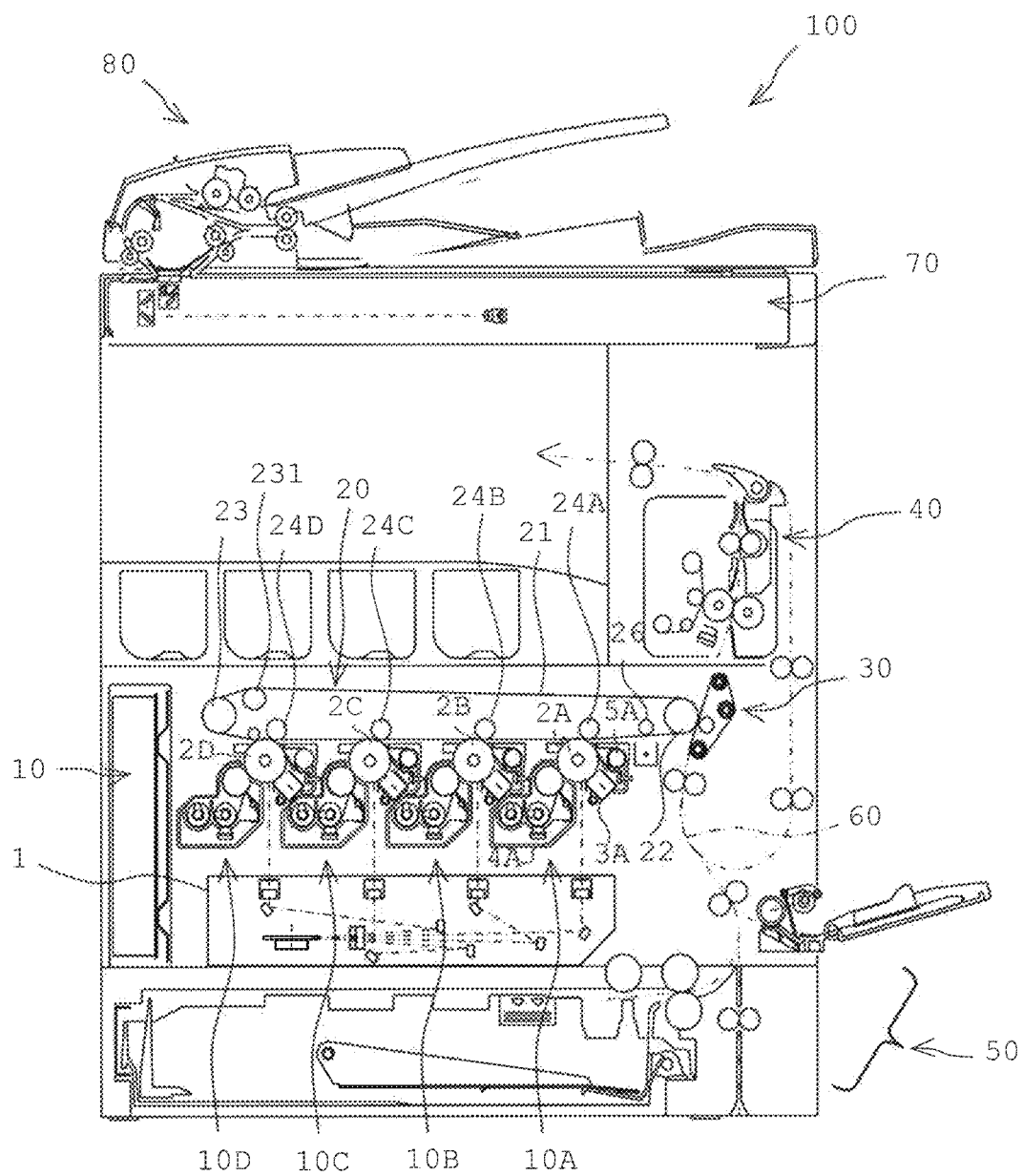
FIG. 1 is a configuration diagram illustrating an overall structure of an image forming apparatus according to the present invention.

An image forming apparatus 100, as shown in FIG. 1, is provided with an image forming portion 10, an intermediate transfer portion 20, a secondary transfer portion 30, a fixing portion 40, a paper feed portion 50, and a paper sheet feed path 60. Additionally, in the upper portion of the image forming apparatus 100, a reading portion 70 that optically reads an image on a document, and an automatic document feeder 80 are mounted. The image forming apparatus 100 duplicates (copies) the image read from the document onto a recording paper sheet, and also receives a document file or an image file prepared by application software installed in a non-illustrated information processing device or a document file or an image file stored in an external storage portion and then types (prints) out on a recording paper sheet.

The image forming portion 10 is provided with a laser scanning unit 1 and image forming portions 10A to 10D each of which has a similar structure. The laser scanning unit 1 has a housing in which optical components such as a laser element and a polygon mirror for laser scanning for each color are arranged inside. The laser scanning unit 1 scans by exposures the surfaces of photoreceptor drums 2A to 2D of the image forming portions 10A to 10D in an axial direction (primary scanning direction) with laser light modulated corresponding to the image data of each color after conversion, and forms an electrostatic latent image of each color. The image forming portion 10A as a representative example of the image forming portions 10A to 10D is provided with the photoreceptor drum 2A and is also provided with a charging device 3A, a developing device 4A, and a cleaning portion 5A around the photoreceptor drum 2A in the rotational direction (secondary scanning direction) of the photoreceptor drum 2A.

The intermediate transfer portion 20 is provided with an intermediate transfer belt 21, a driving roller 22, an idle roller 23, and primary transfer rollers 24A to 24D and primarily transfers toner images formed on the peripheral surfaces of the photoreceptor drums 2A to 2D on the surface of the intermediate transfer belt 21. The secondary transfer portion 30 secondarily transfers the toner image on the surface of the intermediate transfer belt 21 onto a recording paper sheet. The fixing portion 40 heats and fixes the toner image transferred onto the recording paper sheet and outputs the toner image to a paper output tray. The paper feed portion 50 is provided with a paper feed cassette or a manual feed tray and feeds a selected recording paper sheet from a corresponding paper feed cassette to the paper sheet feed path 60. It is to be noted that the paper feed portion 50 may be configured to be provided with two or more paper feed cassettes that store a recording paper sheet of various sizes.

Although not illustrated in FIG. 1, the image forming apparatus 100 is provided with a display portion 101 and an operating portion 102 (see FIG. 2A for both portions) that are configured by a touch panel, for example, in a proper place of the main body of the image forming apparatus 100 and is also provided with a communication portion 103 (see FIG. 2A) that is connected to be able to communicate with a terminal 200 (see FIG. 2B) through a network (LAN (Local Area Network), for example). In addition, a facsimile portion in an image processing portion m 110 illustrated in FIG. 2A is configured to be able to be connected to a telephone line through an NCU (Network Control Unit).

Figure 2A:
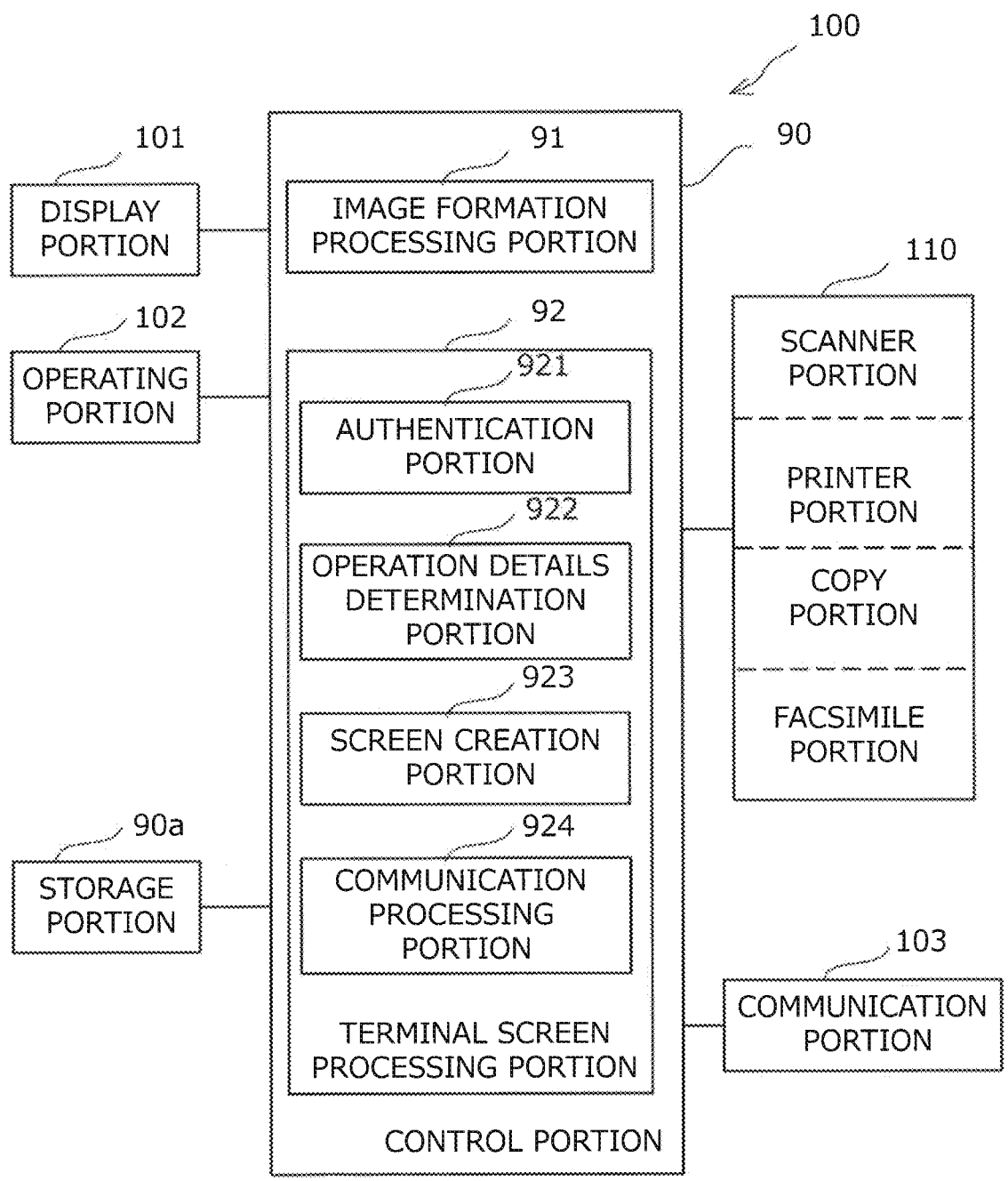
FIG. 2A is a block diagram of the image forming apparatus.

As illustrated in FIG. 2A, the image forming apparatus 100 is provided with the image processing portion 110 provided with image information processing modes, such as a scanner portion, a printer portion, a copy portion, and a facsimile portion, according to the function. The modes may also include an internet facsimile processing mode when necessary. In the present preferred embodiment, for example, the scanner portion performs the function of the reading portion 70, the printer portion and the copy portion perform the function of the image forming portion 10 and other components, and the facsimile portion performs the function of the scanner portion, the NCU, and a facsimile communication portion.

Moreover, the image forming apparatus 100 is provided with a control portion 90 consisting of a computer that controls the apparatus in an integrated manner. The control portion 90 is connected to a storage portion 90a that includes a memory area in which a processing program is stored and a work area in which the information processing and processing details are temporarily stored, a display portion 101 that displays an image, an operating portion 102 including a key or a button that receives an operation from a user, a communication portion 103, and an image processing portion 110. It is to be noted that, although not illustrated, the control portion 90 includes a driver made of software that makes each of the image information processing modes performed.

The control portion 90 is provided with an image formation processing portion 91 that controls the execution of each of the image information processing modes by the image processing portion 110, and a terminal screen processing portion 92 that functions as a UI (User Interface) that configures a screen on the side of the terminal, the screen being changed corresponding to the operation on the side of the terminal 200. Since the image processing portion 110 and the image formation processing portion 91 are publicly known, the descriptions are omitted.

The terminal screen processing portion 92, by executing a processing program, responds to an operation from the terminal 200, and functions as an authentication portion 921, an operation details determination portion 922, a screen creation portion 923, and a communication processing portion 924.

Figure 2B:
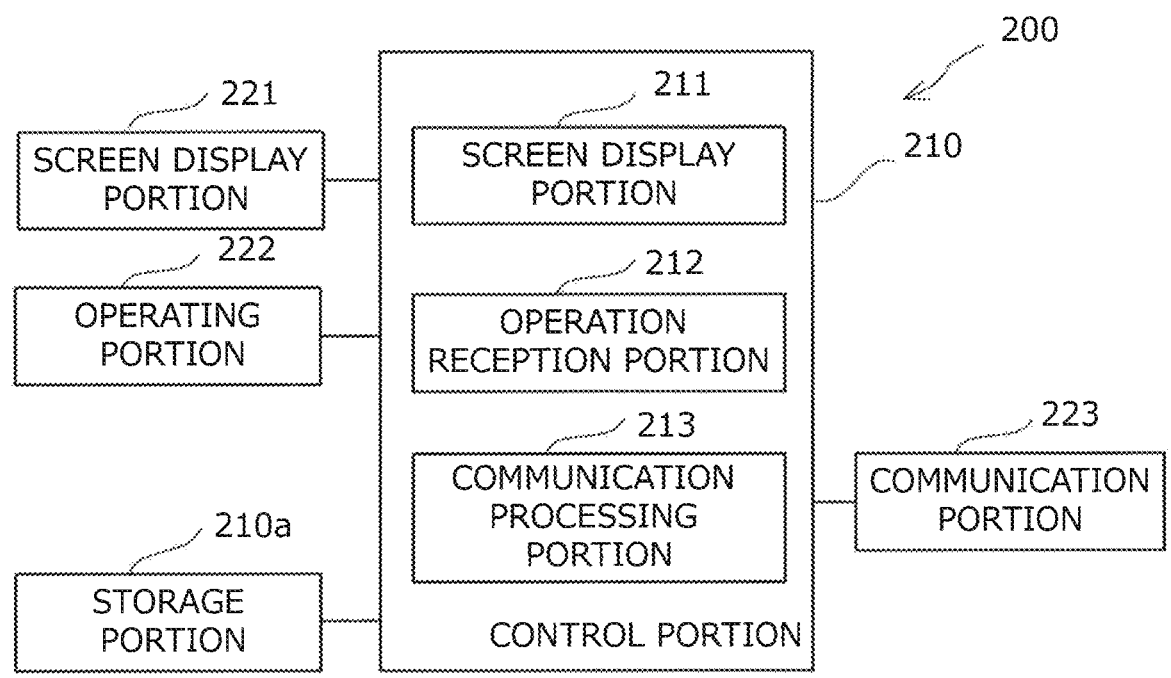
FIG. 2B is a block diagram of a terminal.

Here, the terminal 200 according to a preferred embodiment of the present invention will be described briefly with reference to FIG. 2B. The terminal 200 is provided with a control portion 210 configured by a computer, a storage portion 210a connected to the control portion 210, a display portion 221 and an operating portion 222 that are configured by a touch panel and the like, and a communication portion 223. The storage portion 210a includes a memory area in which a processing program is stored and a work area. The display portion 221 displays an image. The operating portion 222 causes a cursor to point to a button or an icon in a display screen or to another display position, and specifies a position mainly by a click operation. The communication portion 223 communicates with the image forming apparatus 100 through the LAN. The control portion 210, by executing a processing program, functions as a screen display portion 211, an operation reception portion 212, and a communication processing portion 213.

Subsequently, a description will be given of each function portion of the terminal screen processing portion 92 of the image forming apparatus 100, and each function portion of the control portion 210 of the terminal 200

To begin with, a functional item, a tab, and a list page will be described. When a type of the functional item used for the image information processing is exemplified according to the image information processing modes, such as printer settings, copy settings, facsimile/image transmission settings, a printer settings mode includes basic settings, standard condition settings, and other various functions. The copy settings mode includes basic settings, standard condition settings, print menu settings, character settings of a print menu in the lower layer of the settings, and other various functions. Similarly, the facsimile/image transmission settings mode includes facsimile/image transmission settings, common settings, basic settings in the lower layer of the settings, prohibition settings, transmission source registration, and classification settings, also includes scanner settings, standard condition settings in the lower layer of the settings, basic settings, a default destination address, and other various functions, and further includes a large number (several tens to several hundreds) of functional items.

The image forming apparatus 100, with respect to each of the image information processing modes as described above, previously sets standard specification as a default while, by allowing a user to previously set the specification, setting the specification details of each of the image information processing modes to specification details desired by the user. Since a large number of functional items are prepared for each screen (each page), a plurality of functional items, for example, may be previously divided by function and may be prepared as a plurality of standard tabs, which thus reduces display density and makes an operation easier. The functional items that have centrally or hierarchically been divided into each of the standard tabs may preferably be provided (transmitted) to and displayed on the terminal 200 as a user interface, by the terminal screen processing portion 92. On the other hand, with respect to the standard tabs, an individual tab having a list page that a user can register and delete may preferably be prepared, for the functional item that the user often uses among the plurality of functional items, and may preferably be provided to and displayed on the terminal 200, by the terminal screen processing portion 92, and thus much easier operability is further ensured.

The authentication portion 921 authenticates the validity of login from the terminal 200. For example, at the time of connection to the image forming apparatus 100, the login screen illustrated in FIG. 3 is transmitted to the terminal 200, the input of a user name and a password is received, and then the validity of the user name and the password is authenticated. In a case in which the authentication is successful, a home screen as illustrated in FIG. 4, for example, is transmitted.

The screen display portion 211 receives a screen image transmitted from the terminal screen processing portion 92, and displays a login screen, a home screen, and a screen to be created corresponding to operation details.

The operation reception portion 212 receives a click operation to a button, an icon, or another display position that are desired in the screen currently being displayed, and acquires position information (display coordinate information) on the clicked screen. The clicked position information is transmitted to the image forming apparatus 100 by the communication processing portion 213 each time the position information is acquired.

The operation details determination portion 922 determines the operation details in the terminal 200 according to the position information transmitted from the terminal 200. Since the position coordinate of the display portion 221 of the terminal 200 is associated with the button, the icon or other display addresses that are displayed, from acquired position information, the details of the button, the icon, or other images that are displayed at the position are able to be identified. The operation details determination portion 922, from identified details, specifies the details that have been operated by the user on the side of the terminal 200.

The screen creation portion 923 creates a screen image on the side of the terminal 200 corresponding to the operation details every time the operation details of the user are specified by the operation details determination portion 922. The communication processing portion 924 transmits a created screen image to the terminal 200.

Here, a description will be given of each screen (see FIG. 4 to FIG. 10) that is provided to the terminal 200 on or after the login screen (see FIG. 3). As illustrated in FIG. 4, the home screen (initial screen) is displayed on the screen 221a of the display portion 221. On the home screen, from the first line on the left side, five tabs 2210 such as "status," "address book," "file operation," "user management," and "system settings," for example, are displayed. In FIG. 4, a "status" tab 22101 on the left end is selected and the image of the head page relating to "multifunction machine information" is displayed.

It is to be noted that a screen 221a displays two windows. The window on the left side is a page selection area 2211a, and the window on the right side of the screen 221a is a function setting area 2211b. In addition, a cursor 2212 for vertical scrolling is displayed on the right end of the screen 221a, and a logout button 2213 is displayed on the upper right of the screen 221a so as to be able to be operated.

Figure 5:
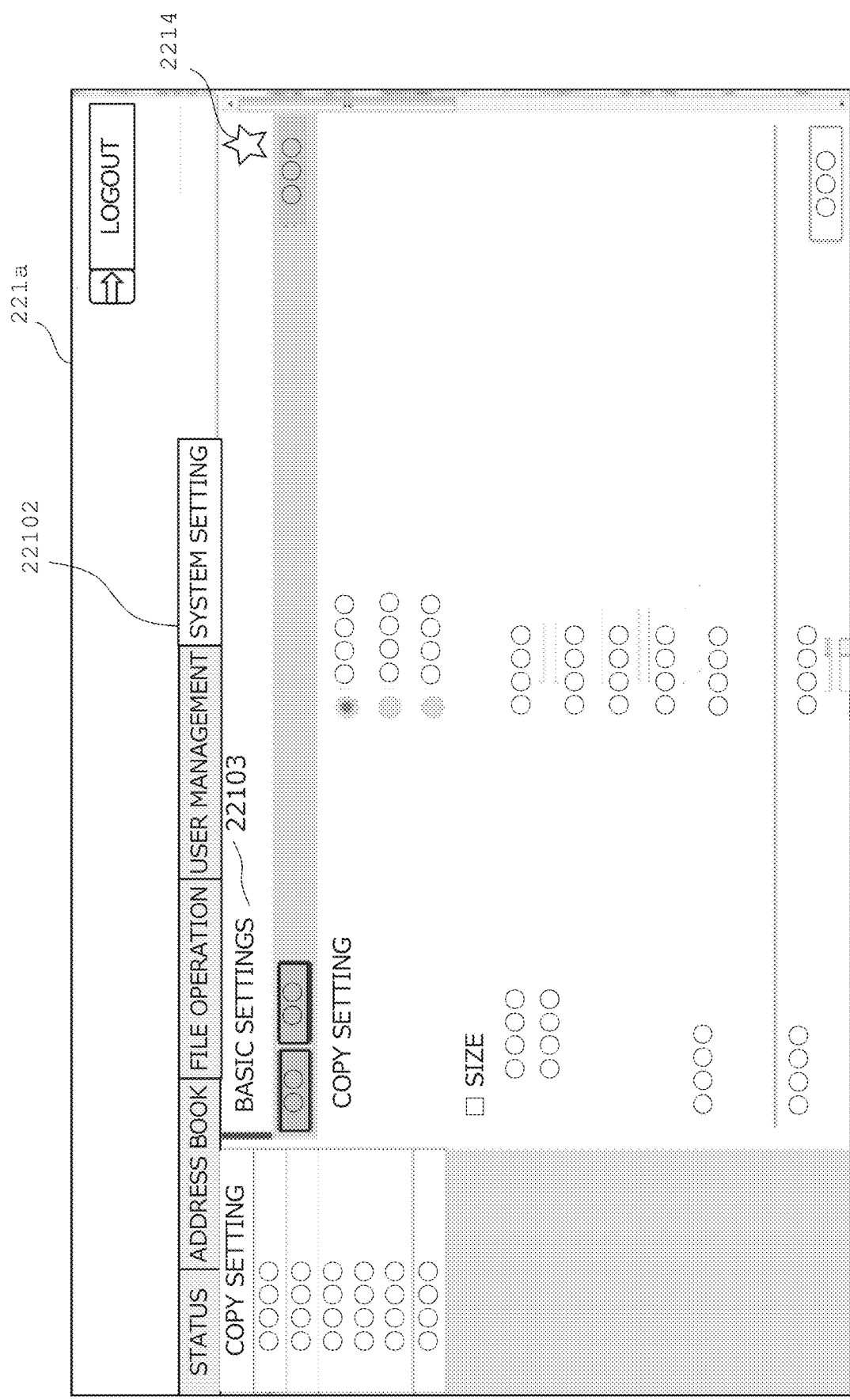
FIG. 5 is one screen view illustrating functional items in system settings displayed on the terminal, that is, a screen view in a case in which a shortcut tab is not displayed.

In FIG. 5, the "system settings" tab 22102 is selected, and, for example, the screen of a functional item of the "basic settings" 22103 is displayed. FIG. 5 illustrates that a shortcut symbol (shortcut button) 2214 is displayed in the non-display state (to be described later) and the "shortcut" tab is not set up. It is to be noted that, while various modes are able to be employed for the non-display state of the shortcut symbol 2214, in FIG. 5, a star shaped mark is shown only by a frame border and is in a hollow state, which makes the non-display state capable of being visually recognized. Such a visually recognized non-display state, irrespective of the display and non-display of the shortcut symbol 2214, makes it possible to select a shortcut symbol 2214 and to set a shortcut.

Figure 6:
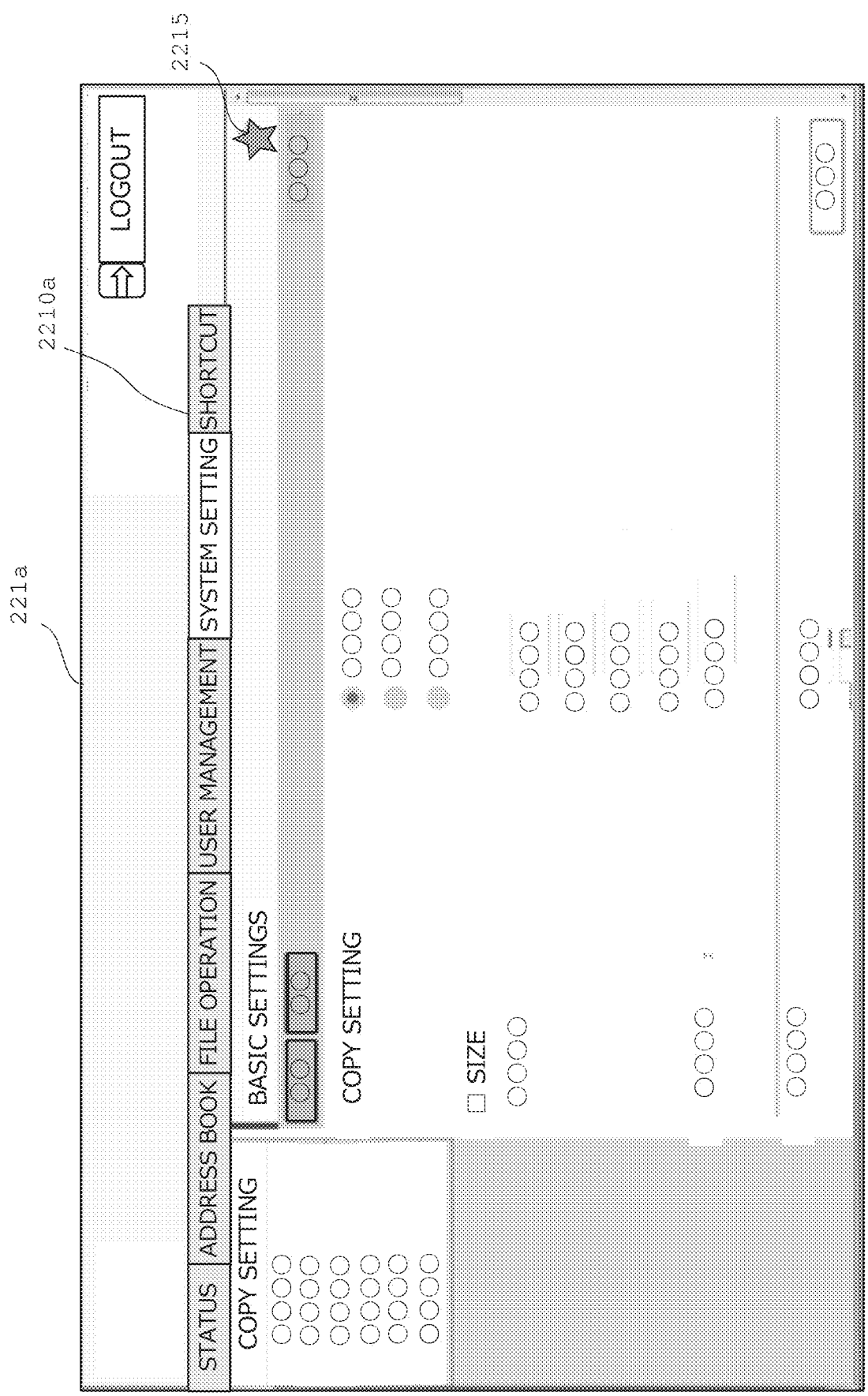
FIG. 6 is one screen view illustrating the functional items in the system settings displayed on the terminal, that is, a screen view in a case in which the shortcut tab is displayed.

FIG. 6 illustrates that a shortcut symbol 2215 is displayed and a "shortcut" tab 2210a is displayed. It is to be noted that the shortcut symbol 2215 is in the state in which the entire star shaped mark is filled in predetermined color so as to be distinguished from the not-displayed shortcut symbol 2214. In a case in which the shortcut symbols 2214 and 2215 are not distinguished from each other, the shortcut symbols 2214 and 2215 are simply referred to as a shortcut button.

Figure 7:
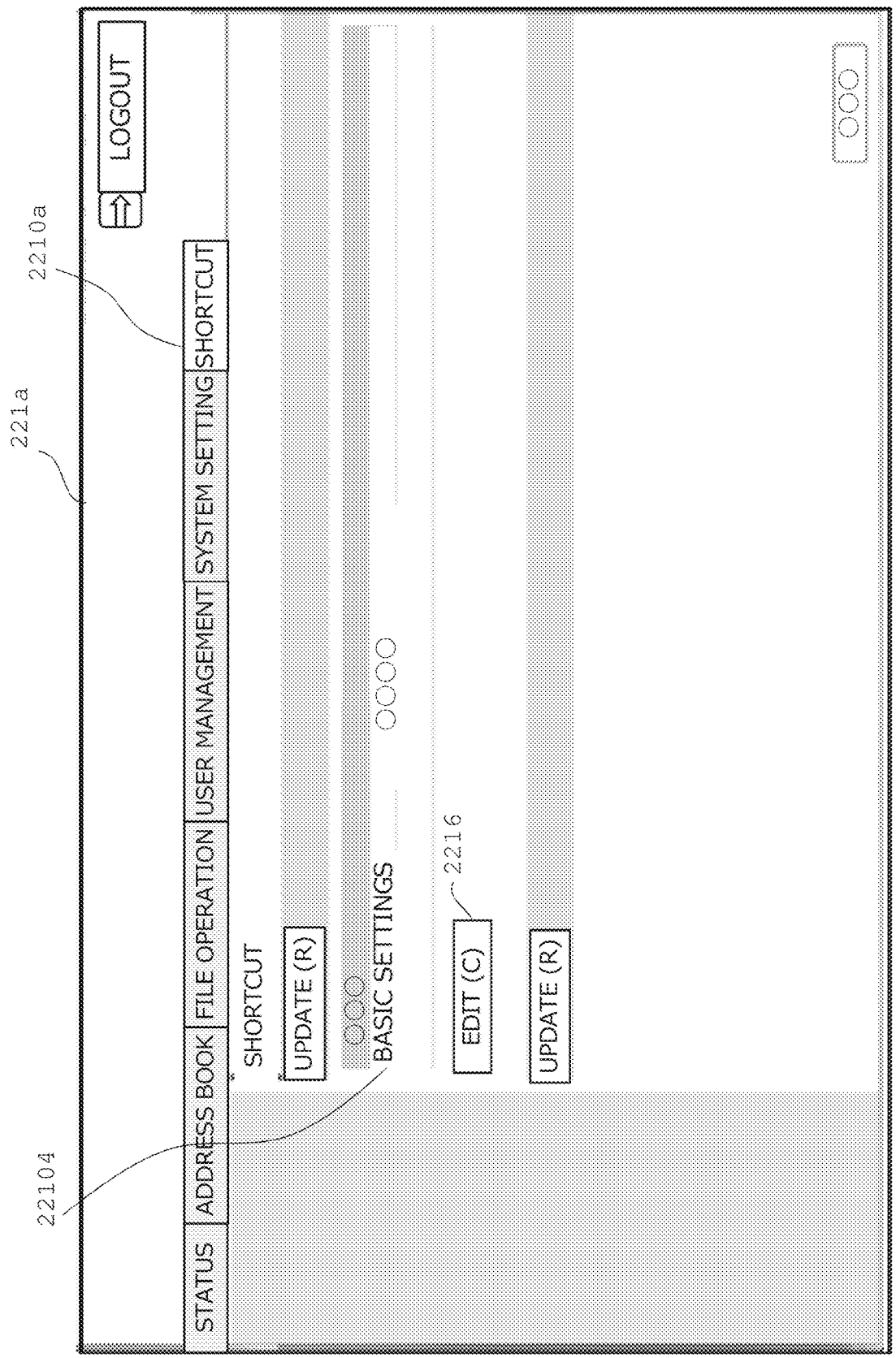
FIG. 7 is a screen view of a list page when the shortcut tab displayed on the terminal is opened.

FIG. 7 is a screen view of a list page when the "shortcut" tab 2210a is selected. In FIG. 7, update buttons are provided on the upper and lower sides of the window, and, between the update buttons, registered functional items are sequentially arranged and displayed in a table form in the lengthwise direction (In FIG. 7, the functional item of a page title of "basic settings" 22104 has a link and is registered). Immediately below a table, an edit button 2216 is displayed so as to be selected. The edit button 2216 is used when the function of a selected page title is set.

Figure 8:
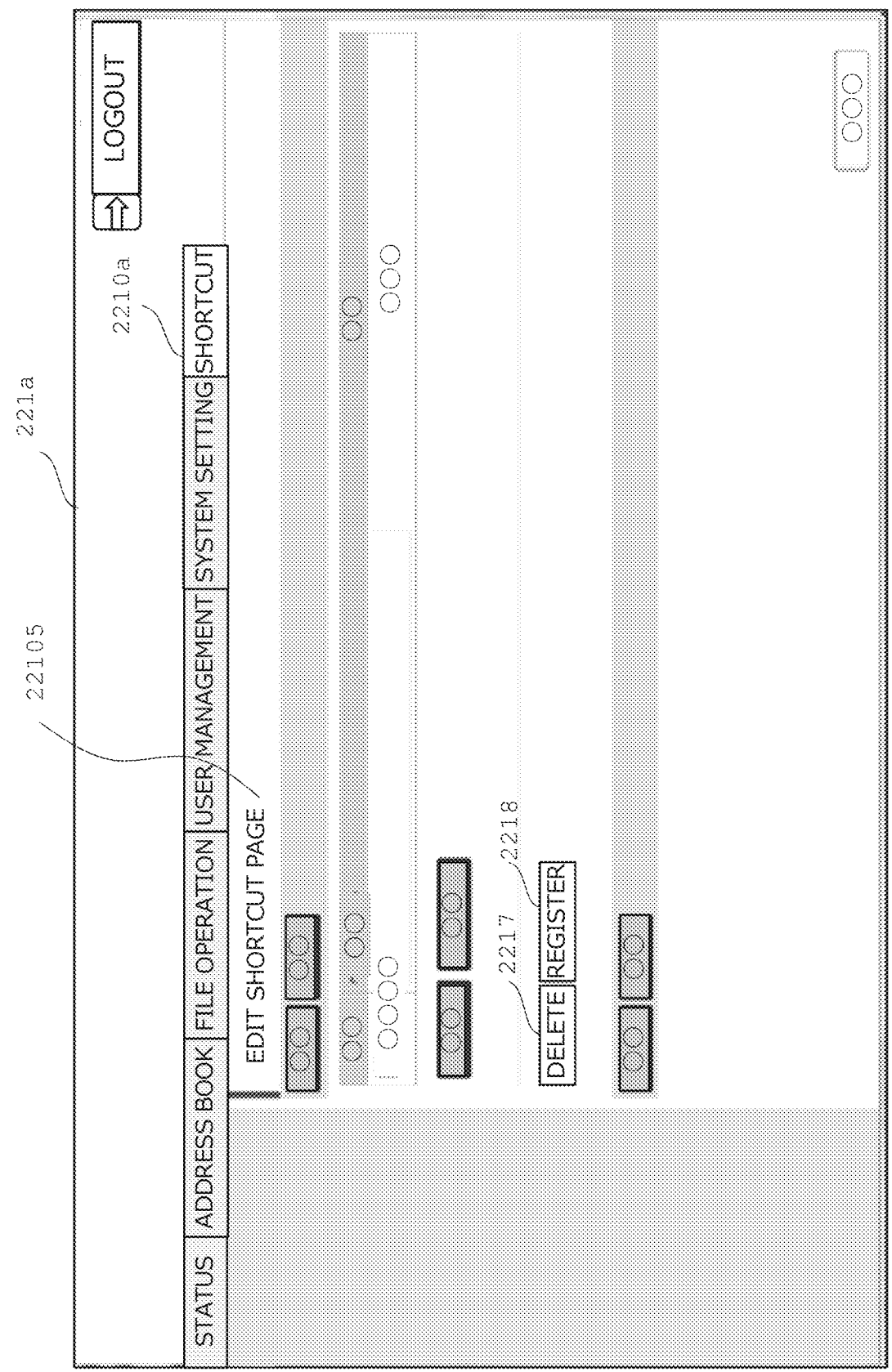
FIG. 8 is an edit screen view of a shortcut page displayed on the terminal in the case in which the shortcut tab is displayed.

FIG. 8 is a screen view of an edit 22105 of the "shortcut" page of FIG. 7 and is a screen in a case in which the "shortcut" tab 2210a is displayed. It is to be noted that a deletion button 2217 and a registration button 2218 are illustrated in FIG. 8. The deletion button 2217 and the registration button 2218 perform commands mainly to register a new functional item or to delete a registered functional item. On the other hand, FIG. 9 is a screen of an "edit a shortcut page" 22105, that is, a screen view when the last functional item is deleted, in other words, the "shortcut" tab is not displayed in response to a message 2219 of "successfully processed".

Figure 9:
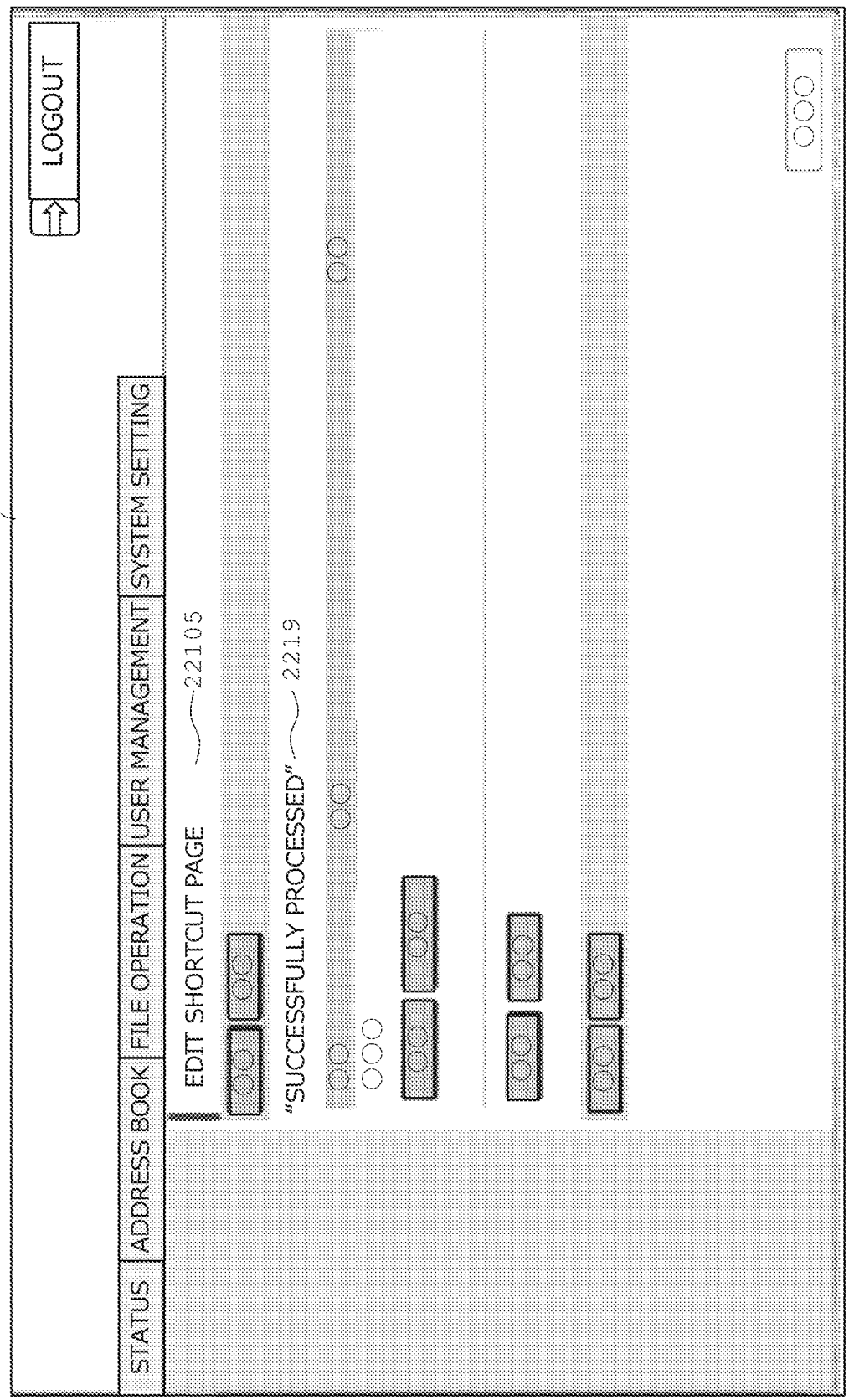
FIG. 9 is an edit screen view of a shortcut page displayed on the terminal in the case in which the shortcut tab is not displayed.
Figure 10:
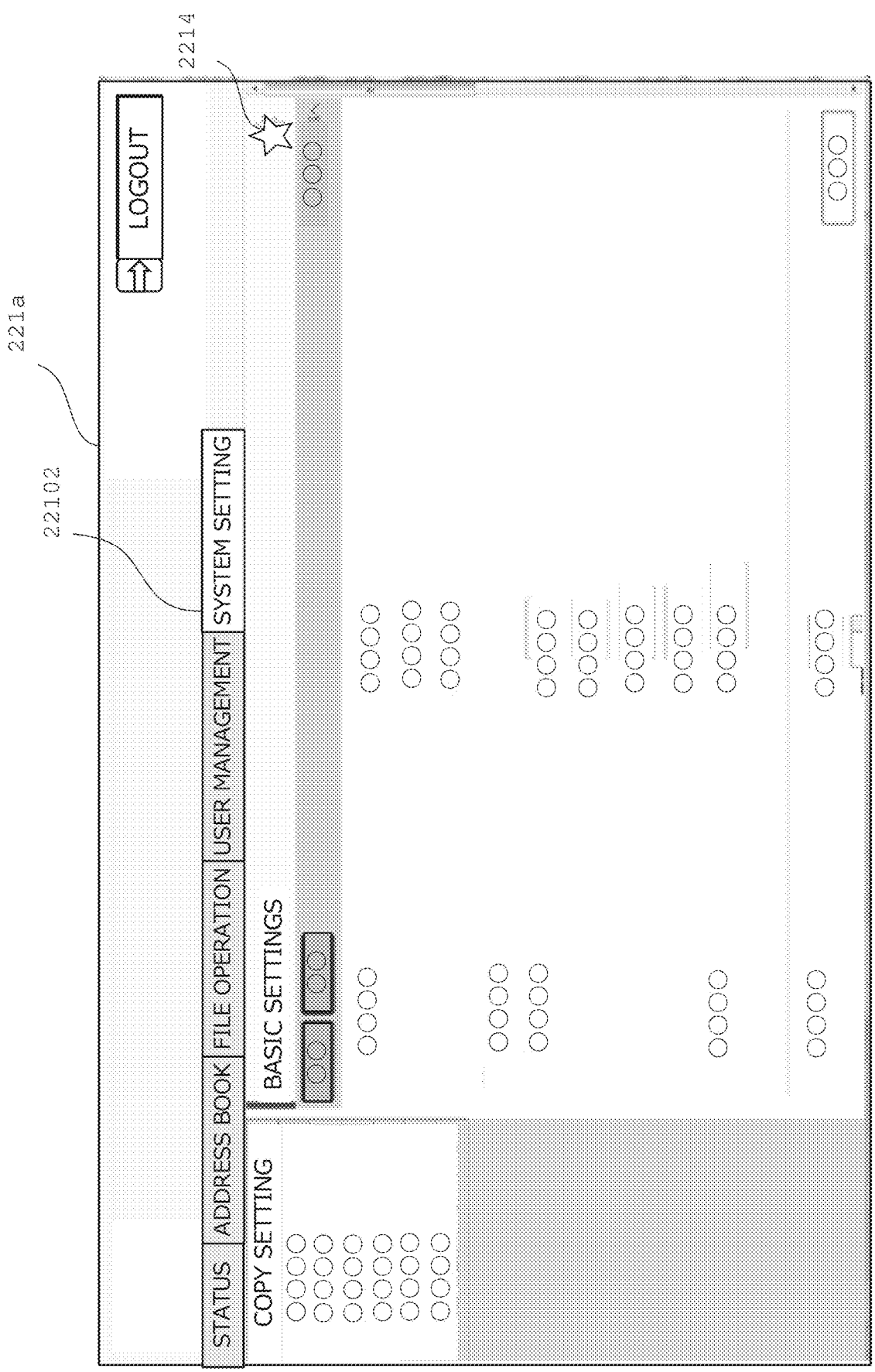
FIG. 10 is one screen view illustrating the functional items in the system settings displayed on the terminal, that is, a screen view in a case in which the shortcut tab is not displayed.

FIG. 10 is a screen view in which a tab other than the "shortcut", that is, the "system settings" tab 22102, for example, is selected after the state as illustrated in FIG. 9, the "shortcut" tab is not displayed, and the shortcut symbol 2214 that shows not-display is displayed.

Figure 11:
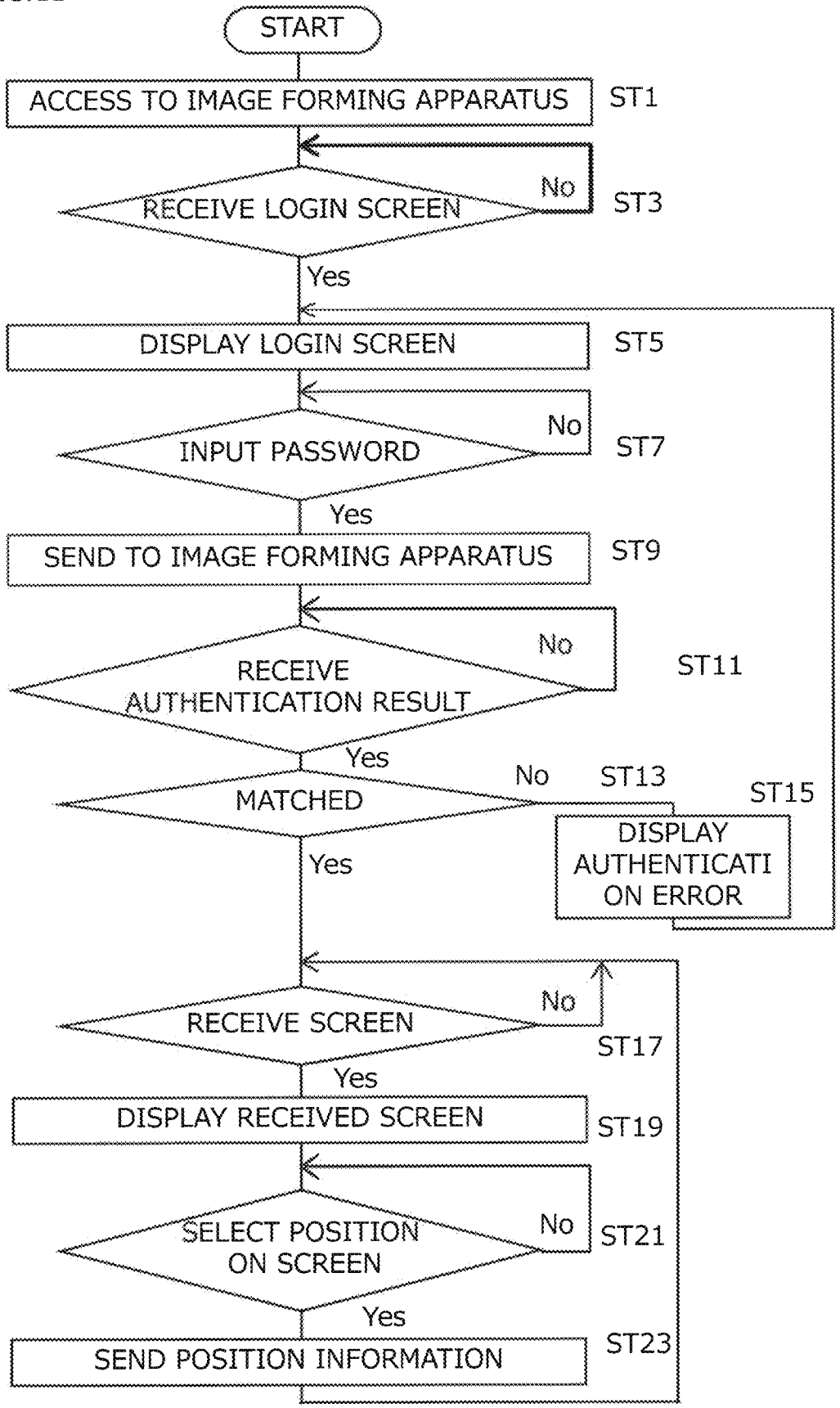
FIG. 11 is a flow chart of a function setting process performed by the terminal.

Subsequently, the operation will be described. To begin with, a description will be given of processing that the control portion 210 of the terminal 200 executes with reference to the flow chart illustrated in FIG. 11. The terminal 200 specifies an address of the image forming apparatus 100 and makes access via LAN (step ST1). The terminal 200 receives a login screen transmitted from the image forming apparatus 100 in response to this access and displays the login screen on the display portion 221 (steps ST3 and ST5). When a password is inputted to a displayed login screen (step ST7), input details are transmitted to the image forming apparatus 100 (step ST9).

Subsequently, the terminal 200 receives the authentication result from the image forming apparatus 100 (step ST11) and determines whether or not the result is matched (step ST13). If the result is not matched (No in step ST13), in other words, if authentication fails, the display of an authentication error is performed (step ST15), and the processing returns to step ST5. On the contrary, if the result is matched, in other words, if the authentication succeeds, a home screen (FIG. 4) is transmitted and received (step ST17), and is displayed on a screen (step ST19).

Subsequently, the presence of selection (click operation, for example) with respect to a position on the screen 221a is determined (step ST21), and, in a case in which the presence of the selection is determined, the information on a selection position is transmitted to the image forming apparatus 100 (step ST23). On the side of the image forming apparatus 100, from received position information, the operation details in the terminal 200 are determined and a screen corresponding to the operation details is created and transmitted to the terminal 200 (step ST17). Hereinafter, by repeating similar processing, each processing to selection (registration, deletion) of a functional item and function settings is performed in each screen and, accordingly, the display and non-display processing of the "shortcut" tab as well as the shortcut symbol is executed.

Figure 12:
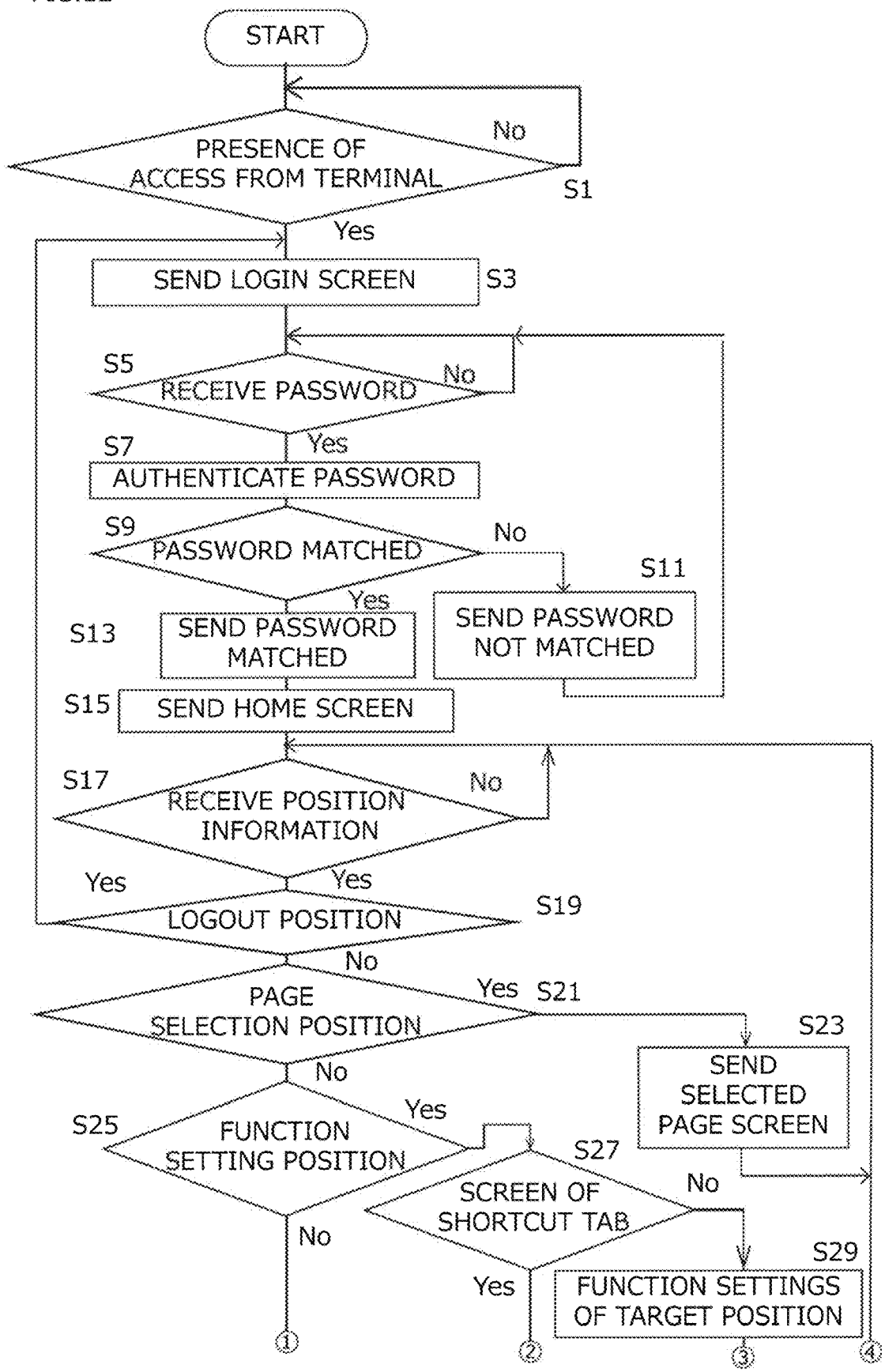
FIG. 12 is a flow chart of function setting processing performed by the image forming apparatus.
Figure 13:
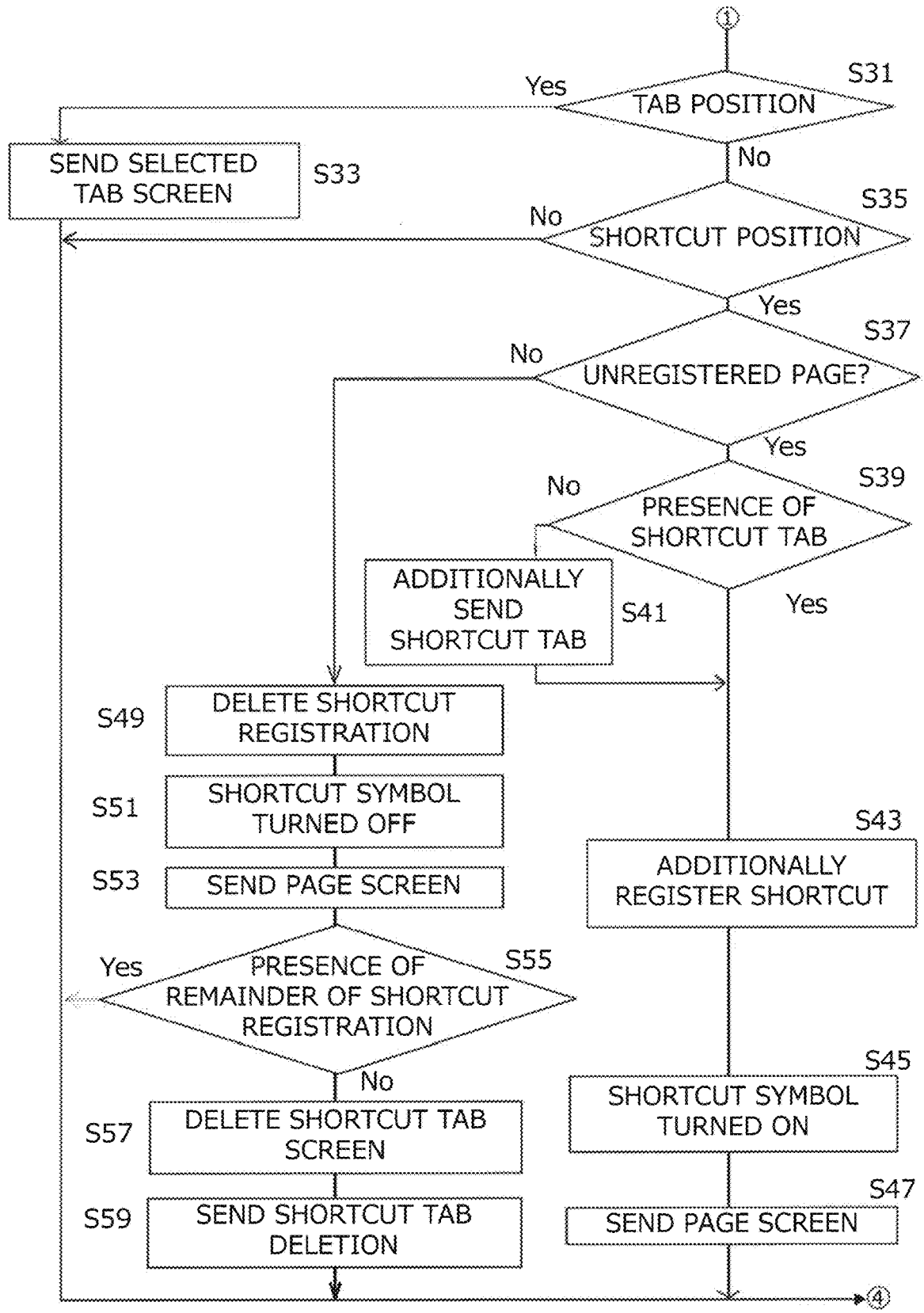
FIG. 13 is a flow chart of the function setting processing performed by the image forming apparatus.
Figure 14:
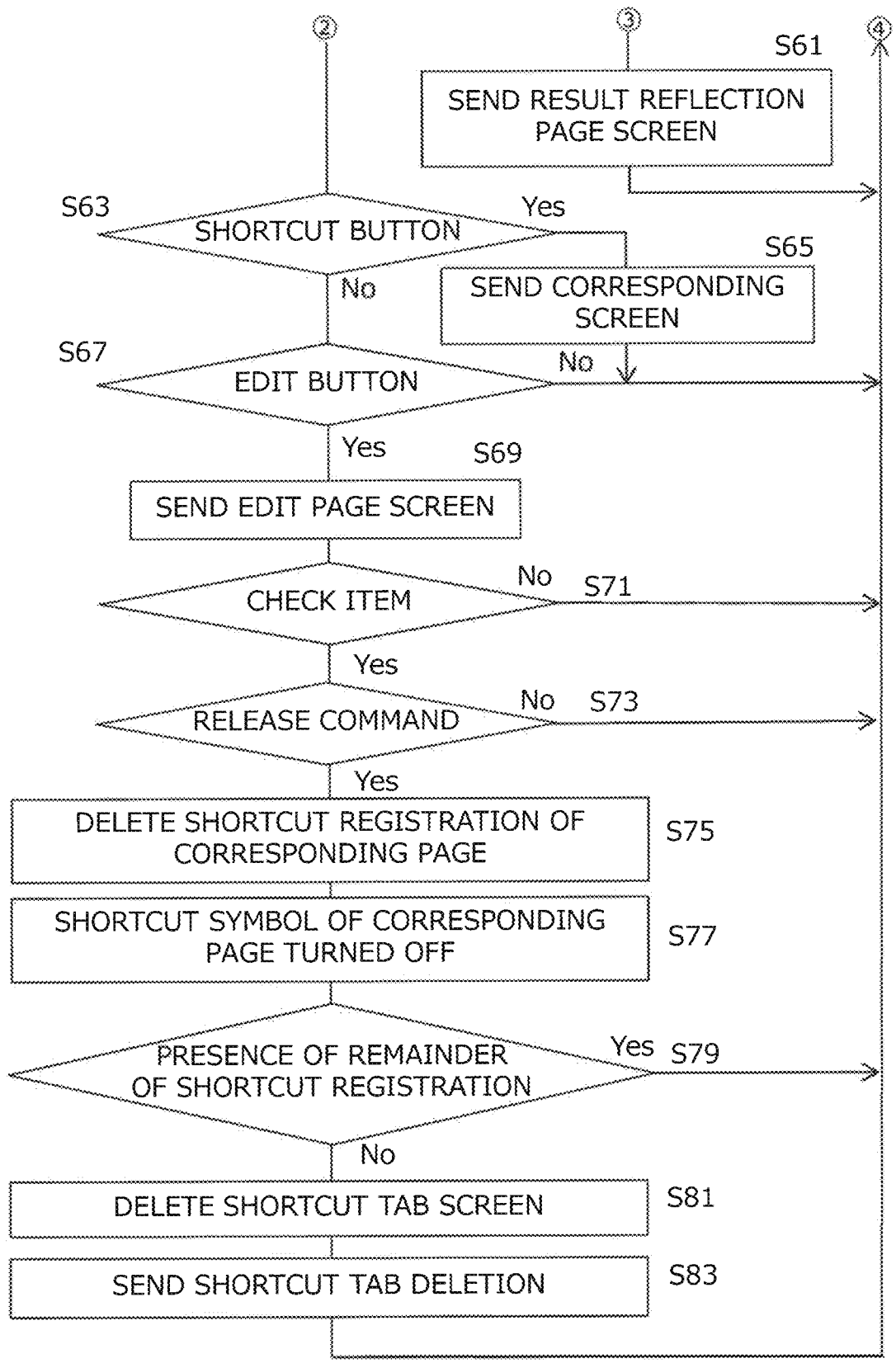
FIG. 14 is a flow chart of the function setting processing performed by the image forming apparatus.

FIG. 12 to FIG. 14 are flow charts illustrating the processing on the side of the image forming apparatus 100, the processing being performed corresponding to an operation of the terminal 200. To begin with, the presence of access from the terminal 200 is determined (Step S1). When access is present, a login screen is transmitted (Step S3) and the reception of a password is waited (Step S5). When a password is received, password authentication is performed (Step S7) and whether or not the password is matched is determined (Step S9). If the password is not matched, the result that the password is not matched is transmitted to the terminal 200 (Step S11), and the processing returns to Step 5. On the other hand, if the password is matched, the result that the password is matched is transmitted to the terminal 200 (Step S13) and a home screen is transmitted (Step S15).

Subsequently, the reception of the position information corresponding to the operation details on the side of the terminal 200 is performed (Step S17). When the position information is received, to begin with, whether or not received position information is in the display area of the logout button 2213 in the display screen, in other words, whether or not the logout button 2213 has been selected, is determined (Step S19). If the logout button 2213 has been selected, the processing returns to transmission processing of a login screen (Step S3).

On the other hand, if the logout button 2213 is not selected, subsequently, whether or not a position is in the page selection area 2211a (see FIG. 4) (Step S21). When determination that the position is in the page selection area 2211a is made, a page screen that has been selected corresponding to the position is created and transmitted to the terminal 200 (Step S23), the processing is then returned to Step S17, and the reception processing of the following position information is repeated.

On the other hand, if the position is not in the page selection area 2211a in Step S21, subsequently, whether or not the position is in the function setting area 2211b (see FIG. 4) is determined (Step S25). Then, when determination that the position is not in the function setting area 2211b is made, whether or not the position is a tab position is determined (Step S31). If the position is in a tab position, a tab screen that has been selected is created and transmitted to the terminal 200 (Step S33). On the other hand, if the position is not in a tab position, whether or not the position is a shortcut position as a position of the shortcut symbol 2214 or 2215 is determined (Step S35), and if the position is not a shortcut position, the processing returns to Step S17. If the position is a shortcut position, subsequently, whether or not a page in which a shortcut is to be set is an unregistered page (functional item) is determined (Step S37).

If the page is an unregistered page, whether or not a shortcut tab is present is determined (Step S39), if a shortcut tab is present, the processing proceeds to Step S43, and, however, if no shortcut tab is present, a screen to which a "shortcut" tab 2210a is added (see FIG. 6, for example) is created and transmitted to the terminal 200 (Step S41), and then the processing proceeds to Step S43.

In Step S43, a shortcut is additionally registered, and then a page screen (FIG. 6, for example) in which the shortcut symbol is turned on (displayed) (Step S45) is created and transmitted to the terminal 200 (Step S47). Subsequently, the processing returns to Step S17.

On the other hand, if determination that the page is not an unregistered page in Step S37 is made, an identical shortcut that has been already registered is deleted (Step S49), and then a screen in which the shortcut symbol 2215 is turned off (not displayed) (Step S51) is created and transmitted to the terminal 200 (Step S53). Next, whether or not a remainder of the shortcut that has been registered as a shortcut is present is determined (Step S55), and, if the remainder is present, the processing returns to Step S17. On the other hand, if the remainder is not present, all the shortcuts are considered to have been deleted, a screen in which the shortcut tab is deleted (FIG. 10, for example) is created (Step S57) and transmitted to the terminal 200 (Step S59), and the processing returns to Step S17.

However, when determination that the position is in the function setting area 2211b is made in Step S25, whether or not the current screen is the screen of the shortcut tab (FIG. 7, for example) is determined (Step S27). Here, if the screen is not the screen of the shortcut tab, function settings to a target position, that is, a selected functional item are performed (Step S29), a page screen in which the setting result is reflected is transmitted to the terminal 200 (Step S61), and the processing returns to Step S17.

In addition, in Step S27, if the current screen is the screen of the shortcut tab, whether or not a shortcut button is selected is determined (Step S63), if a shortcut button is selected, a screen that displays a corresponding page is created and transmitted to the terminal 200 (Step S65), and the processing then returns to Step S17.

On the other hand, if a shortcut button is not selected in Step S63, whether or not the edit button 2216 is selected is determined (Step S67), and, if the edit button 2216 is not selected, the processing returns to Step S17. If the edit button 2216 is selected in Step S67, a screen that displays an edit page (FIG. 8, for example) is created and transmitted to the terminal 200 (Step S69). Subsequently, whether or not the operation of an item is checked is determined (Step S71), and, if the operation is a check operation of an item, whether or not the operation is a release command is determined (Step S73). It is to be noted that the determination in both Steps S71 and S73 is No, the processing returns to Step S17.

In a case in which the operation is the release command in Step S73, the registration of the shortcut of a corresponding page is deleted (Step S75), and subsequently the shortcut symbol of the corresponding page is turned off (Step S77). Next, whether or not a remainder of the shortcut that has been registered as a shortcut is present is determined (Step S79), and, if the remainder is present, the processing returns to Step S17. On the other hand, if the remainder is not present, the last shortcut is considered to have been deleted and the shortcut tab is deleted from the screen (Step S81), and the screen in which the shortcut tab 2210*a* is not displayed (FIG. 9, for example) is transmitted to the terminal 200 (Step S83).

The details of the functional item included in the shortcut tab 2210*a* (individual tab) that has been set up as described above are registered in units of user or without distinction among the users, into the storage portion 90*a*. When the details are registered without distinction among users, details to be set later are overwritten and registered. It is to be noted that, in a case in which an image forming job is executed after registration, a job in which the setting details are reflected is executed if user authentication is performed from the terminal 200 or by using an authentication card (short-range communication card or the like) that a user possesses.

While, in a first preferred embodiment, the plurality of functional items are previously divided into a plurality of standard tabs, alternatively, a mode in which the plurality of functional items are stored in one standard tab or arrayed and displayed without a tab may be employed.

While, in the first preferred embodiment, the display and non-display of the shortcut symbol are able to be identified in a mode in which the frame is displayed and the entirety is filled in color, instead, color, density (brightness), lighting and flashing display, and size may be used for identification.

In addition, while, in the first preferred embodiment, the display and non-display are displayed in an identifiable mode, which enables the display area to be effectively used only at one place since the shortcut symbol is also used as the shortcut button, as a second preferred embodiment, a shortcut symbol may be literally made displayed or not-displayed and a shortcut button may be constantly displayed in another mode.

Moreover, while, in the first preferred embodiment, the display efficiency and utilization efficiency of a large number of functional items that the image forming apparatus includes is enhanced by using a shortcut function, as a third preferred embodiment, in place of the image forming apparatus, information processing devices such as a server and a host computer are able to be employed and applied. For example, in a mode in which information and data are centrally or hierarchically classified into various categories and registered in an information processing device and also are divided and managed in a fixed tab, furthermore, with respect to a user, an individual tab as a custom-build list page may be able to be used, and a mode in which a user can register or delete and use a tab, taking a frequency in use and importance into consideration when necessary, may be applied to the individual tab. In such a case, a list page may be made not-displayed when no registration information is in the individual tab. In addition, the individual tab, as long as being provided for the efficient utilization of information, is not limited to a shortcut function.

Moreover, while, in the first preferred embodiment, a mode in which the shortcut tab is created for each user is employed, a user may be able to browse the content of a shortcut tab of other users by selecting the update button in the screen and may add the content to an own shortcut tab when necessary.

The foregoing preferred embodiments are illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

What is claimed is:

1. An information processing device connected to a terminal including a display and an operator through a network and capable of executing a plurality of functions relating to information processing, the information processing device comprising:
 a controller configured or programmed to:
  function as a screen creator that creates an individual tab including a plurality of functional items previously arranged for each screen and having screen information of a list page in which a functional item among the plurality of functional items for each screen is able to be arbitrarily registered and a functional item among registered functional items is able to be arbitrarily deleted; and
  function as a setting processor that receives a command to register and delete a functional item that is arbitrarily selected by the operator to the individual tab having the screen information of the list page displayed on the display of the terminal, from the terminal through the network, causes a storage to store an arbitrarily selected functional item related to the registration and deletion, and also reads the screen information of the list page of a result of the registration and deletion from the storage and guides the screen to the display of the terminal, wherein
 the screen creator, when receiving a command to delete the arbitrarily selected functional item from the terminal through the network, determines whether a remaining functional item after the deletion is present from storage content of the storage,
 the screen creator creates a screen in which the individual tab having the screen information of the list page is not displayed upon deletion of a last functional item such that no remaining functional item is present, and guides the screen to the display of the terminal through the network, and the screen creator creates a screen displaying a shortcut symbol button that shows display and non-display corresponding to display and non-display of the individual tab, and guides the screen to the display of the terminal through the network.

2. The information processing device according to claim 1, wherein the plurality of functional items for each screen are previously divided into a plurality of standard tabs.

3. The information processing device according to claim 1, wherein the screen creator, at registration of a first functional item, creates a screen in which the list page is displayed and the individual tab is also displayed and guides the screen to the display of the terminal.

4. The information processing device according to claim 1, wherein the screen creator creates a screen in which the list page is not displayed and the individual tab is not displayed and guides the screen to the display of the terminal.

5. The information processing device according to claim 1, wherein, at the registration of the functional item, the selected functional item is set to the list page of the individual tab by a shortcut.

6. An image forming apparatus comprising the information processing device according to claim 1, wherein the information processing device includes at least two or more image information processing modes among image information processing modes of printing, copying, scanning, and facsimile.

7. The information processing device according to claim 1, wherein the screen creator, when receiving from the terminal through the network a command to the shortcut symbol button that shows the non-display, creates a screen of the individual tab having the list page, and guides the screen to the display of the terminal through the network.

8. The information processing device according to claim 1, wherein the shortcut symbol button showing the display is distinguished from the shortcut symbol button showing the non-display.

9. The information processing device according to claim 1, wherein the shortcut symbol button showing the display is displayed at a same position as the shortcut symbol button indicating the non-display.

* * * * *